United States Patent
Noy et al.

(10) Patent No.: US 8,515,817 B2
(45) Date of Patent: Aug. 20, 2013

(54) SYSTEMS AND METHODS OF MATCHING PURCHASE REQUESTS WITH CONSUMMATED SALES

(75) Inventors: Oded Noy, Los Angeles, CA (US); Jason McBride, Santa Monica, CA (US); James Berger, Los Angeles, CA (US); Rosa Welton, Bell Gardens, CA (US); Scott Painter, Bel Air, CA (US)

(73) Assignee: Truecar, Inc., Santa Monica, CA (US)

( * ) Notice: Subject to any disclaimer, the term of this patent is extended or adjusted under 35 U.S.C. 154(b) by 1386 days.

(21) Appl. No.: 11/968,137

(22) Filed: Dec. 31, 2007

(65) Prior Publication Data
US 2009/0171761 A1 Jul. 2, 2009

(51) Int. Cl.
*G06Q 30/00* (2012.01)
(52) U.S. Cl.
USPC ....................................... 705/26.1
(58) Field of Classification Search
USPC ........... 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
See application file for complete search history.

(56) References Cited

U.S. PATENT DOCUMENTS

| | | | |
|---|---|---|---|
| 5,377,095 A | 12/1994 | Maeda et al. | |
| 6,282,517 B1 | 8/2001 | Wolfe et al. | |
| 6,609,108 B1 | 8/2003 | Pulliam et al. | |
| 6,882,983 B2 * | 4/2005 | Furphy et al. | 705/30 |
| 6,892,185 B1 * | 5/2005 | Van Etten et al. | 705/26.8 |
| 7,113,090 B1 | 9/2006 | Saylor | |
| 7,133,835 B1 | 11/2006 | Fusz et al. | |
| 7,546,243 B2 * | 6/2009 | Kapadia et al. | 705/1.1 |
| 7,596,501 B2 * | 9/2009 | Tivey et al. | 705/317 |
| 7,596,512 B1 | 9/2009 | Raines et al. | |
| 7,599,842 B2 * | 10/2009 | Tivey et al. | 705/1.1 |
| 7,747,474 B2 * | 6/2010 | Miloslavsky et al. | 705/26.1 |
| 7,801,798 B1 * | 9/2010 | Huemer et al. | 705/37 |
| 7,818,201 B2 * | 10/2010 | Shevlin et al. | 705/7.13 |
| 7,945,483 B2 | 5/2011 | Inghelbrecht et al. | |
| 8,000,989 B1 * | 8/2011 | Kiefhaber et al. | 705/7.12 |
| 8,036,952 B2 | 10/2011 | Mohr et al. | |
| 8,078,515 B2 * | 12/2011 | John | 705/35 |
| 8,095,422 B2 | 1/2012 | Hallowell et al. | |

(Continued)

FOREIGN PATENT DOCUMENTS

| | | |
|---|---|---|
| EP | 1326176 | 9/2003 |
| WO | WO 01/40898 A2 | 6/2001 |
| WO | WO 01/40898 A3 | 11/2007 |

OTHER PUBLICATIONS

Gregory M. Collins, "Technology Opens Up Huge CRM Opportunities for Retailers", Jun. 10, 2002. Retrieved from http://www.destinationcrm.com/Articles/PrintArticle.aspx?ArticleID=47419.*

(Continued)

*Primary Examiner* — Naeem Haq
(74) *Attorney, Agent, or Firm* — Sprinkle IP Law Group

(57) ABSTRACT

A sales matching system which may match sales of products or services with consummated sales by collecting selected leads from a group of lead suppliers, collecting a plurality of sales records from multiple sales sources, and matching at least some of the sales records to selected leads. The matches may be assigned a matching confidence, and may reach a threshold level of confidence to be considered a matched sale. The system may also generate invoices to selected sellers identifying invoice-able sales for which compensation may be obtained in exchange for providing leads giving rise thereto.

18 Claims, 4 Drawing Sheets

(56) References Cited

U.S. PATENT DOCUMENTS

| | | | |
|---|---|---|---|
| 8,219,464 B2 | 7/2012 | Inghelbrecht et al. | |
| 8,255,270 B2 | 8/2012 | Rose et al. | |
| 2001/0037205 A1* | 11/2001 | Joao | 705/1 |
| 2002/0007331 A1 | 1/2002 | Lo et al. | |
| 2002/0111856 A1* | 8/2002 | Messer et al. | 705/14 |
| 2002/0116348 A1 | 8/2002 | Phillips et al. | |
| 2002/0147625 A1* | 10/2002 | Kolke, Jr. | 705/9 |
| 2002/0194051 A1 | 12/2002 | Hall et al. | |
| 2003/0028437 A1 | 2/2003 | Grant et al. | |
| 2003/0065532 A1 | 4/2003 | Takaoka | |
| 2003/0083961 A1 | 5/2003 | Bezos et al. | |
| 2003/0105728 A1 | 6/2003 | Yano et al. | |
| 2003/0200151 A1 | 10/2003 | Ellenson et al. | |
| 2003/0229577 A1* | 12/2003 | Nabel | 705/37 |
| 2004/0014454 A1* | 1/2004 | Burgess et al. | 455/405 |
| 2004/0019516 A1 | 1/2004 | Puskorius et al. | |
| 2004/0093284 A1 | 5/2004 | Takaoka | |
| 2004/0128224 A1 | 7/2004 | Dabney et al. | |
| 2004/0143473 A1* | 7/2004 | Tivey et al. | 705/8 |
| 2004/0143476 A1* | 7/2004 | Kapadia et al. | 705/9 |
| 2004/0143482 A1* | 7/2004 | Tivey et al. | 705/10 |
| 2004/0210485 A1 | 10/2004 | Luo et al. | |
| 2005/0071249 A1 | 3/2005 | Nix et al. | |
| 2005/0108112 A1 | 5/2005 | Ellenson et al. | |
| 2005/0125308 A1 | 6/2005 | Puentes et al. | |
| 2005/0144061 A1 | 6/2005 | Rarity et al. | |
| 2005/0171859 A1* | 8/2005 | Harrington et al. | 705/26 |
| 2005/0197941 A1 | 9/2005 | Veit | |
| 2005/0209934 A1 | 9/2005 | Irby et al. | |
| 2005/0256780 A1 | 11/2005 | Eldred | |
| 2005/0261951 A1* | 11/2005 | Tighe | 705/10 |
| 2005/0267774 A1 | 12/2005 | Merritt et al. | |
| 2006/0080210 A1 | 4/2006 | Mourad et al. | |
| 2006/0085209 A1 | 4/2006 | Walker, III | |
| 2006/0085283 A1 | 4/2006 | Griffiths | |
| 2006/0106668 A1* | 5/2006 | Kim et al. | 705/10 |
| 2006/0129423 A1 | 6/2006 | Sheinson et al. | |
| 2006/0212355 A1* | 9/2006 | Teague et al. | 705/14 |
| 2007/0005446 A1 | 1/2007 | Fusz et al. | |
| 2007/0038522 A1 | 2/2007 | Bell et al. | |
| 2007/0112582 A1* | 5/2007 | Fenlon | 705/1 |
| 2007/0219851 A1* | 9/2007 | Taddei et al. | 705/10 |
| 2007/0244797 A1 | 10/2007 | Hinson et al. | |
| 2007/0250327 A1 | 10/2007 | Hedy | |
| 2008/0177590 A1 | 7/2008 | Brodsky et al. | |
| 2008/0189156 A1 | 8/2008 | Voda et al. | |
| 2008/0201163 A1 | 8/2008 | Barker et al. | |
| 2008/0201203 A1 | 8/2008 | Rose et al. | |
| 2008/0288361 A1* | 11/2008 | Rego et al. | 705/26 |
| 2008/0300962 A1 | 12/2008 | Cawston et al. | |
| 2009/0006118 A1 | 1/2009 | Pollak | |
| 2009/0037356 A1* | 2/2009 | Rothstein et al. | 706/46 |
| 2009/0048859 A1* | 2/2009 | McCarthy et al. | 705/1 |
| 2009/0187513 A1 | 7/2009 | Noy et al. | |
| 2010/0070343 A1 | 3/2010 | Taira et al. | |
| 2010/0070344 A1 | 3/2010 | Taira et al. | |
| 2012/0259728 A1 | 10/2012 | Inghelbrecht et al. | |

OTHER PUBLICATIONS

Rick Gibbs, "How Google Base Replaces Autos Classifieds", Nov. 27, 2006. Retrieved from http://www.imediaconnection.com/printpage/printpage.aspx?id=12548.*

No Author, "3 reasons why using Google pays off for automobile dealers", 2005. Retrieved from http://www.kaistudios.com/PPC/guides/Google-autodealers.htm.*

Goldberg. Job security through PPC-CRM integration. paydigest.com. Date of publication: Aug. 22, 2007.

Säuberlich, et al. Analytical Lead Management in the Automotive Industry. Springer Link. 'Heidelberg, Springer Berlin. 2006; 290-299.

Office Action for U.S. Appl. No. 13/524,116, mailed Nov. 27, 2012, 13 pgs.

Office Action issued for Chinese Patent Application No. 200980141911.3, mailed Feb. 6, 2013, 9 pages.

Examination report issued for European Patent Application No. 09 813 513.0, mailed Mar. 20, 2013, 7 pgs.

Notice of Allowance for U.S. Patent Application No. 13/524,116, mailed Apr. 25, 2013, 8 pgs.

"Carfax and EDS Announce New On-Line Service," PR Newswire, Oct. 13, 1994, 2 pgs., Dialog, Dialog File No. 148 Accession No. 7538982 at http://www.toolkit.dialog.com/intranet/cgi/present?STYLE=1360084482&PRESENT=DB-148,A . . .

Office Action for U.S. Appl. No. 12/179,164, mailed May 8, 2013, 19 pgs.

Office Action issued for Chinese Patent Application No. 200980142589.6, mailed Apr. 15, 2013, 10 pages.

International Search Report and Written Opinion for PCT Application No. PCT/US2009/056316, mailed Oct. 26, 2009, 7 pgs.

International Search Report and Written Opinion for PCT Application No. PCT/US2009/056315, mailed Oct. 20, 2009, 7 pgs.

International Search Report and Written Opinion for PCT Application No. PCT/US2009/056317, mailed Dec. 10, 2009, 8 pgs.

Office Action for U.S. Appl. No. 12/556,137, mailed Sep. 1, 2010, 14 pgs.

cars.com, http://cars.com/ Internet Archive Jul. 18, 2007—http://web.archive.org/web/20070718071752/www.car.com/.

Office Action for U.S. Appl. No. 12/556,137, mailed Dec. 30, 2010, 15 pgs.

edmunds.com http://www.edmunds.com/Internet Archive Jan. 18, 2010—http://web.archive.org/web/20080118210310/http://www.edmunds.com/ printed Dec. 15, 2010, 3 pgs.

Notice of Allowance for U.S. Appl. No. 12/556,137, mailed Feb. 10, 2011, 7 pgs.

Office Action for U.S. Appl. No. 13/080,832, mailed Oct. 12, 2011, 12 pgs.

Second Written Opinion for PCT Application No. PCT/US09/56317, mailed Dec. 6, 2011, 6 pgs.

Office Action for U.S. Appl. No. 12/556,076 mailed Dec. 27, 2011, 13 pgs.

Office Action for U.S. Appl. No. 12/556,109, mailed Jan. 24, 2012, 16 pgs.

Notice of Allowance for U.S. Appl. No. 13/080,832 mailed Feb. 10, 2012, 8 pgs.

"CarPrices.com, Selectica and JATO Dynamics Enter Agreement to Deliver Online Car Configuration Package", Business Wire, Dec. 13, 1999, 5 pgs. [recovered from Dialog on Feb. 2, 2012].

Office Action for U.S. Appl. No. 12/556,076, mailed Mar. 26, 2012, 14 pgs.

Office Action for U.S. Appl. No. 12/556,109, mailed Mar. 26, 2012, 15 pgs.

Office Action for U.S. Appl. No. 12/179,164, mailed Sep. 30, 2009, 19 pgs.

Office Action for U.S. Appl. No. 12/179,164, mailed Apr. 8, 2010, 20 pgs.

"Innovative Website Moves Consumer Auto Purchases Online: Capital One Offers Miami Buyers a One-Stop Resource for Car Purchase, Putting an End to Hassles and Frustration," Business Wire, New York, Jul. 18, 2006, 3 pgs.

Office Action for U.S. Appl. No. 12/179,164, mailed Oct. 27, 2010, 20 pgs.

Office Action for U.S. Appl. No. 12/179,164, mailed Feb. 15, 2011, 20 pgs.

Office Action for U.S. Appl. No. 12/179,164, mailed Sep. 2, 2011, 21 pgs.

International Preliminary Report on Patentability (IPRP) for PCT Patent Application No. PCT/US2009/056316, mailed May 1, 2012, 6 pgs.

Extended European Search Report for European Patent Application No. 09 813 513.0, mailed Feb. 21, 2012, 8 pgs.

Extended European Search Report for European Patent Application No. 09 813 514.8, mailed Apr. 25, 2012, 5 pgs.

International Preliminary Report on Patentability for PCT Patent Application No. PCT/US2009/056315, mailed May 16, 2012, 7 pgs.

Office Action for U.S. Appl. No. 12/179,164, mailed May 25, 2012, 21 pgs.

Corrected Notice of Allowability for U.S. Appl. No. 13/080,832, mailed Jun. 7, 2012, 4 pgs.

Corrected Notice of Allowability for U.S. Appl. No. 13/080,832, mailed Jun. 8, 2012, 4 pgs.

English translation of Office Action for Chinese Patent Application No. 200980141911.3, dated May 30, 2012, 4 pgs.

Office Action (with English translation) for Chinese Patent Application No. 200980142589.6, dated Sep. 5, 2012, Chinese Patent Office, 9 pgs.

International Preliminary Report on Patentability for International Patent Application No. PCT/US2009/056317, mailed Sep. 27, 2012, 8 pgs.

Office Action for U.S. Appl. No. 12/179,164, mailed Oct. 9, 2012, 20 pgs.

"Zag Acquires Automotive Invitational Services, Auto-Buying Service for More than 6 Million AAA Members," Business Wire, New York, Jun. 13, 2006, 3 pgs.

Office Action for U.S. Appl. No. 12/179,164, mailed Jan. 29, 2013, 19 pgs.

\* cited by examiner

SYSTEMS AND METHODS OF MATCHING PURCHASE REQUESTS WITH CONSUMMATED SALES

FIELD OF THE INVENTION

This invention is directed to systems and methods of matching leads with sales. The invention may include a sales matching system which may collect selected leads from a group of lead suppliers, collect a plurality of sales data from a variety of sources, including sellers and other sources, and match at least some of the sales records to the selected leads. In addition, the invention may generate invoices to the selected sellers identifying invoice-able sales.

BACKGROUND OF THE INVENTION

Today, the Internet is a useful tool for purchasing products or services. A sale may occur online after a lead has been provided from a lead supplier, which may identify a group of prospective customers, where the lead supplier may be a party other than the seller of the product or service.

Typically, in such situations, the lead supplier may generate an invoice where the seller may compensate the lead supplier for a lead that led to the sale of a product. For example, in the automobile sales industry, there may be a website where potential customers seeking to purchase a car can enter information in order to receive information about car dealerships or online sellers, and contact or be contacted by these car sellers. In such a situation, a business relationship might be created where the dealership or seller could compensate the lead supplier for providing the lead.

Oftentimes, invoices for this business model may be based on easily measurable events such as banner views, page clicks, or the leads themselves. In these situations, the lead suppliers may create an invoice for the sellers, based on information that is within their control as the invoicing party. Since this type of information is within the lead suppliers' control, a lead supplier may easily generate an invoice based on how many times a customer has viewed a banner on its website, clicked an advertisement, or generated a lead.

While looking at customer activity on a lead supplier's website may provide some indication of customer exposure to seller advertisements or whether the customer contacts a seller, it may not provide an accurate indication of how many leads from the lead suppliers actually result in a sale. When a lead is provided, many different actions can occur. For instance, with an online automobile lead, the customer submitting the lead may (1) not purchase at all, (2) purchase somewhere else, (3) purchase as indicated in the lead, or (4) purchase a different product from the same seller, which may not exactly match the lead sent. Although there might be an increased likelihood of a sale occurring from the number of times an advertisement is viewed or a lead is created, this information may not provide any accurate indication of how successfully a lead becomes a sale. Unlike the advertisement and lead information, sales information may not be in the invoicing party's (i.e. the lead supplier's) control, and may mainly reside with other parties, such as the seller.

Even if a lead supplier, or any other invoice-generating party, wanted to receive information from a seller about whether a lead led to a sale, the nature of the relationship is such that a lead supplier or the invoice-generating party would not be able to rely on the seller to self-report sales that are invoice-able. The seller has very little incentive to keep track of leads that become actual sales, because a successful match only results in the seller having to compensate the invoicing party further. Additionally, even if a seller wanted to track leads and sales, it would need to expend a great deal of administrative effort to follow exactly what leads led to a successful purchase of a car, and that effort could be costly to the seller. Thus, with the current system a tension may exist between the lead supplier who lacks sales information but wants to generate invoices on successful leads and the seller who has sales information but has no desire or incentive to put in the effort of tracking a sale from a lead.

For example, one online referral system allows for online and offline collection of information on potential purchasers from lead suppliers and matches this information with relevant participating sellers. See WO 01/40898, which is incorporated by reference in its entirety herein. The lead supplier may join this referral system and be rewarded for each lead supplied or for each sale made. The system attempts to track the sale made by collecting information from the merchants and the customers of the merchants' products and/or services. For instance, when a sale is successfully consummated, the merchant may update the information on the lead and pay the system accordingly. This system runs into the problems mentioned previously relating to how little incentive sellers have to self-report.

There is a need for improved systems and methods of sales matching that may accurately determine how many leads end up in actual sales and generates invoices accordingly.

SUMMARY OF THE INVENTION

The invention provides systems and methods for matching leads with sales. Various aspects of the invention described herein may be applied to any of the particular applications set forth below or for any other types of sales matching systems or methods. The invention may be applied as a standalone system or method, or as part of an integrated business arrangement relating to sales of products or services in which a purchase request may be supplied to a seller. It shall be understood that different aspects of the invention can be appreciated individually, collectively, or in combination with each other.

The invention is directed to systems and methods of matching leads with sales. The invention may include a sales matching system which may collect leads from a group of lead suppliers and sales records from various sources, which may include sellers and other sources, and match at least some of the sales records to the selected leads. Accordingly, the invention may generate an invoice based on the matches of the leads and sales.

An aspect of the invention provides a sales matching system that may include a sales matching service provider. The sales matching service provider may be the owner of the system that may match sales to leads.

The sales matching service provider may automatically collect leads and sales data from multiple sources or systems. Leads may be collected from lead suppliers, which may identify a group of prospective customers for selected products or services, or directly from the customers, and sales data may be collected from sellers or other parties that may have sales data. By having multiple sources of sales data, the sales matching service provider may have a greater chance of spotting a consummated sale that arises out of a lead, and may get around the self-reporting problems that arise when relying only on sellers to provide sales records. For instance, for automobile sales, lead data may include leads from various lead supplier websites or directly from customers interacting with the sales matching service provider. Sales data may include information from a car dealer, loan originators, insurance carriers, and so forth. The data collected may include all of the sales records by the selling entity (such as an automobile dealer) regardless of the source of the customer.

The sales matching service provider may also automatically match sales data with leads. The system may use the collected leads and sales data and some sort of algorithm to match the leads and sales. After finding matches, the system may also automatically assign a matching confidence to each match. The matching confidence may indicate the probability the lead led to the sale. This may result in a matched sale, which may be when a lead is matched with sales data and meets a minimum matching criteria.

The sales matching service provider may automatically generate all the appropriate invoices to the seller based on contractual agreements and a business relationship with the seller. For example, a sales matching service provider and a seller may have a pay-per-sale arrangement, and the seller may compensate the sales matching service provider for each lead that becomes a verified sale. In this situation, the invoices generated may include matches that reach a certain confidence threshold, based on the confidence that is assigned to each match. An invoice-able sale may be a matched sale that can be introduced as a line item in an invoice to the seller based on the contractual agreement. A sales matching service provider and a seller could also have a subscription arrangement, where the seller may pay a fixed amount for a set period of time that the sales matching service provider enables lead suppliers or customers to communicate with the seller. Finding matched sales may still be useful under a subscription arrangement because it may enable parties to determine the value of leads as translated to sales.

Unlike systems that only look at data in the invoice-generating party's control and estimate lead success based on that data, the sales matching service provider may look at sales data from multiple sources to see the actual success of the lead in terms of verified sales. Also, by automatically collecting lead and sales data and matching the leads and sales, the sales matching service provider may gain an accurate sense of how many of the leads provided by suppliers or customers become actual sales by the seller. By using a multiplicity of sources, including sales information from the seller, the sales matching service provider may spot when a sale occurs and access information about the nature of the sale. With this additional information, the sales matching service provider may determine whether the lead became a sale with some degree of confidence. Also, because the seller may not be responsible for tracking the sale and informing the sales matching service provider when a lead becomes a sale, the problems that arise in the usual self-reporting scenario may not arise.

Another embodiment of the invention provides a mechanism that may normalize or clean the lead and sales data that a sales matching service provider receives from various sources. When information is gathered from multiple sources, such as a car dealership and an auto insurance company, the data from each of the sources may be stored in different formats, based on the standards of each of the sources. A normalization mechanism may put the data into a standard format for the sales matching service provider. This normalization may assist with data comparison and matching. The mechanism may also remove any unnecessary data, so only data that is relevant for matching the leads and sales and assigning a matching confidence may remain.

Additionally, the sales matching service provider may also include data cleaning mechanisms that could handle duplicate invoicing and other multiple-source matching conflicts. For instance, a customer could communicate with more than one lead supplier, so that multiple leads could result in a single sale. Also, multiple data sources of sales data could show duplicate information for the same sale, such as when a car dealership sales record and auto insurance company both have records for the same sale.

After the sales matching service provider may try to match the normalized and cleaned data, the system may also have various mechanisms to handle exceptions and edge cases for approval. Matches between leads and sales may be made with varying degrees of confidence. If the matched sale does not clearly meet the threshold confidence to be an approved sale and is not automatically approved, an additional review may assist in determining whether the match may be an approved sale. If this additional review still results in uncertainty, an additional manual review may take place.

This entire system of the sales matching service provider may be fully web-enabled. The sales matching service provider may receive leads and sales data over the Internet from multiple sources, such as lead suppliers and sellers. This information relating to leads and sales data may be stored on one or more servers in databases as with other sources of information described elsewhere herein. A matching engine may automatically match the leads and sales, and the sales matching service provider may generate invoices that may be sent to sellers while keeping track of all financial accounting information. The sales matching service provider may maintain an appropriate level of data security throughout the process.

The sales matching service provider may connect to a data warehouse so that the buyer relationship managers can conduct effective business offline, based on reporting. The data warehouse may store records that may be part of a reporting system that can provide dealers with feedback or analysis based on sales information.

In one embodiment of the invention, a seller may request sales credit or may request to reject sales from the sales matching service provider. A seller may choose to request sales credit or to reject sales if the seller disagrees with an item on an invoice. The sales matching service provider may determine whether to grant the request, and may adjust approved sales and invoice information accordingly.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The features and advantages of the invention may be further explained by reference to the following detailed description and accompanying drawings that sets forth illustrative embodiments.

DETAILED DESCRIPTION OF THE INVENTION

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

Figure 1:
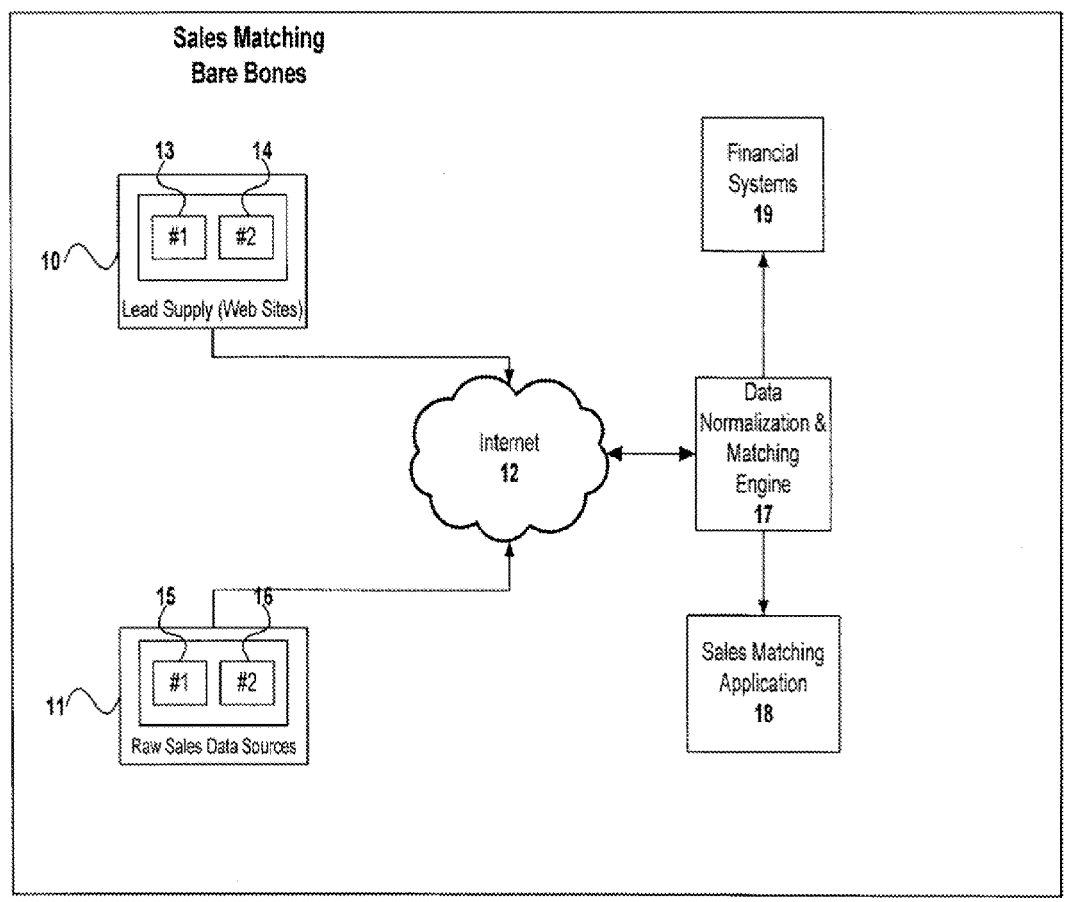
FIG. 1 shows a barebones sales matching system where a lead supply and raw sales data sources may communicate with a sales matching service provider.

Referring to the drawings in detail, FIG. 1 shows a barebones sales matching system. Lead supply 10 and one or more raw sales data source 11 may communicate over the Internet 12 with a sales matching service provider. The lead supply 10 may include web sites of lead suppliers 13, 14 that may identify a group of prospective customers or may include customers that provide leads directly. The raw sales data sources 11 may include sellers and other sources of sales data 15, 16. For instance, in the case of automobile sales, raw sales data sources may include car dealers, loan originators, insurance carriers, and so forth.

The sales matching service provider may include a data normalization and matching engine 17, a sales matching application 18, and financial systems 19. The data normalization and matching engine 17 may receive the information from multiple sources, comprising lead supply 10 and raw sales data sources 11, over the Internet 12. It may normalize all of the data from the multiple sources so that the information has a standard format, which may make it easier to compare and match leads and sales. The data normalization and matching engine 17 may also clean up the data to remove duplicates and other unnecessary information. It may then take the normalized data and match the leads with the sales. It may also assign a confidence for each match, which may help to determine whether a matched sale is an approved sale. The data normalization and matching engine 17 may be in communication with databases that store the information.

The sales matching application 18 may the matched sales that are not obviously an automatically approved sale. The sales matching application 18 may look more carefully at matched sales data and may also look at additional information to determine whether the matched sale reaches the threshold for an approved sale.

The financial systems 19 may create an invoice which may use the approved sale data. The invoice may depend on the business arrangement between the sales matching service provider and the sellers. For example, if there is a pay-per-sale arrangement, the seller may pay the sales matching service provider depending on invoice-able sales. Invoice-able sales may be approved sales, which are matched sales that meet a certain confidence threshold, that also fit the business arrangement. In another example, a sales matching service provider and seller may have a subscription arrangement, where the seller may pay to use the sales matching service provider. If there are uncertainties, there may be mechanisms to deal with conflicts and exceptions and edge cases.

The financial systems 19 may keep track of invoices that have been provided to sellers as well as anything that has been collected from a seller. The financial systems 19 may keep a general accounting for the sales matching service provider.

It shall be understood that any reference to the term leads in the foregoing and following could be interpreted generally and include purchase requests or other communications from a potential buyer.

Figure 2:
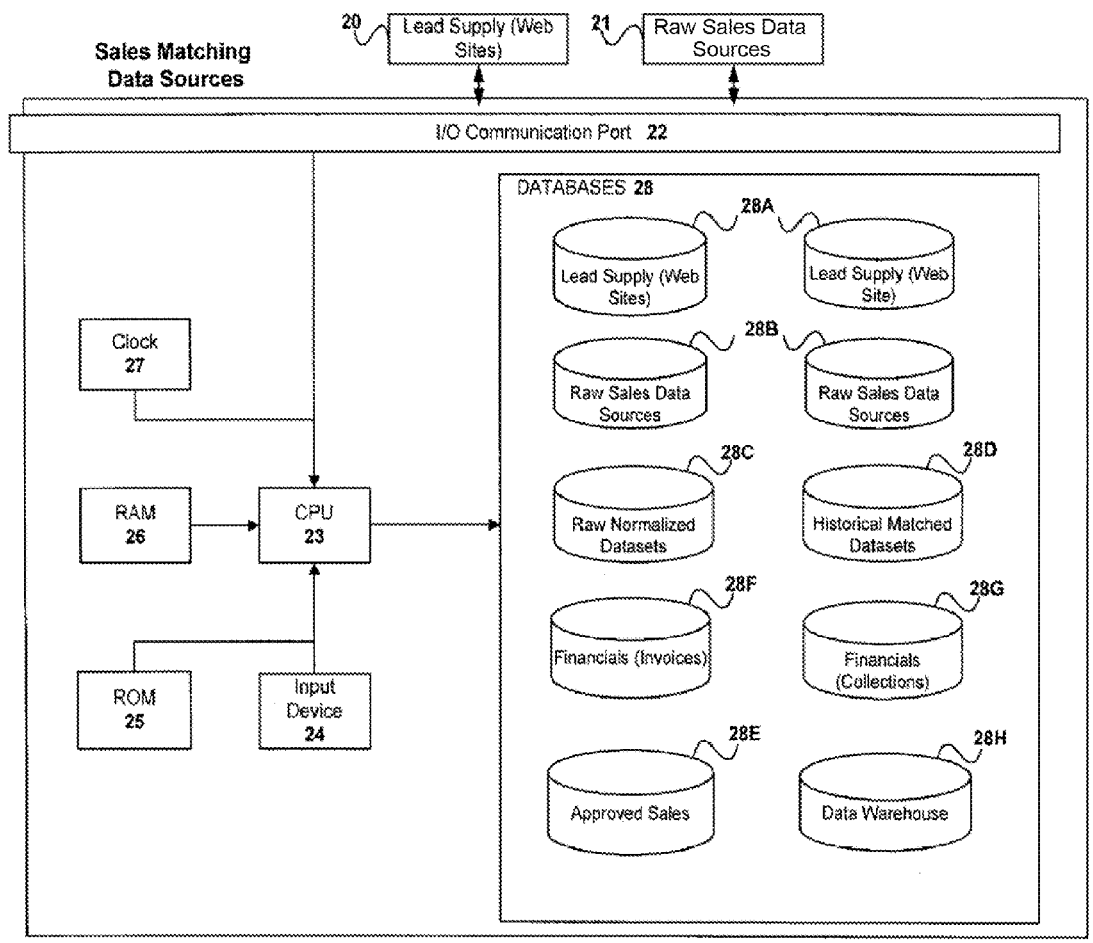
FIG. 2 illustrates lead supply and sales data sources and how the data may be stored in a sales matching system.

FIG. 2 illustrates leads and sales data sources and how data may be stored in a sales matching system. There may be lead supply 20 and raw sales data sources 21 that communicate with a sales matching service provider. An input/output communication port 22 may enable communication between the lead supply 20 and raw sales data sources 21 and the sales matching service provider. The input/output communication port 22 may communicate with a central processing unit (CPU) 23. The CPU 23 may also communicate with an input device 24, ROM 25, RAM 26, a clock 27, and databases 28.

The databases 28 may store information relevant to the sales matching. Data received from lead supply 20 and raw sales data sources 21 may be stored in lead supply and raw sales data sources databases 28A, 28B. There may also be raw normalized datasets 28C, which may include the data received from the lead supply 20 and raw sales data sources 21 that have been normalized and cleaned up so that data may be in a standard format, and any unnecessary information may have been removed. A historical matched dataset 28D may keep track of matched sales, which may include duplicates from multiple sources. An approved sales database 28E may include matched sales that reach a certain confidence threshold and are not duplicates. If there are matches that are exceptions or edge cases, they may have to undergo another approval process. If the confidence threshold is met, the matched sale may be an approved sale which may be stored in the approved sales databases 28E.

There may also be a set of databases devoted to financials 28F, 28G. This may include information about invoices and collections. An invoices database 28F may include invoices generated that may include invoice-able sales. Matched sales may have been processed to determine whether they meet the confidence threshold to become approved sales and fit in the business arrangement to constitute invoice-able sales. A collections database 28G may include accounting information, such as which sellers have paid off their invoices, and so forth.

There may also be a data warehouse 28H. The data warehouse 28H may enable buyer relationship managers to conduct effective business offline, based on reporting. The data warehouse 28H may store records that may be part of a reporting system that can provide dealers with feedback or analysis based on sales information.

Figure 3:
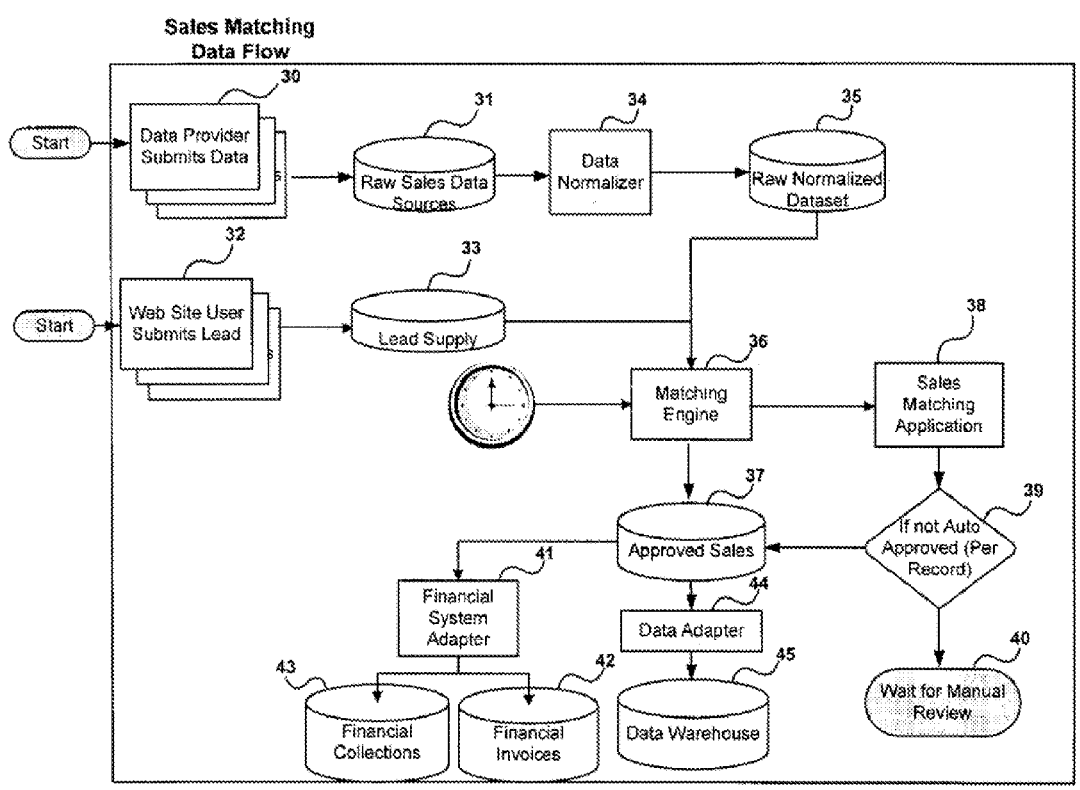
FIG. 3 illustrates data flow within a sales matching system.

FIG. 3 illustrates data flow within a sales matching system. There are several ways that data can get to a matching engine. A sales matching service provider may receive data from lead supply or from raw sales data sources. For lead supply, the source may be a website which provides leads to customers, or may be customers generating the leads directly. At the first step, a lead may be submitted from a web site or a customer 30. This may become the lead supply data, which may be stored in a lead supply database 31. For raw sales data sources, the process may start when a data provider submits sales data 32. The data provider may be one of multiple sources (seller, insurance, etc.). This submitted data may become the raw sales data, which may be stored in a raw sales data sources database 33. The sales data may then go through a data normalizer 34, which may normalize and clean the data. This normalized data may be stored in a raw normalized dataset 35. In one embodiment of the invention, both the lead and sales data may go through the data normalizer, and both sets of normalized data may be stored in the raw normalized dataset.

The normalized lead supply data and the normalized sales data may go through a matching engine 36, which may match the leads and sales. A confidence may be assigned to each match. If the confidence is so great that a sale definitely came from a lead, the match may be approved automatically and may be stored in an approved sales database 37. If the confidence is not automatically approved, then a sales matching application 38 may conduct additional analysis on the match. If, following the sales matching application's 38 analysis, the match reaches a sufficiently high confidence threshold, then the match may be approved and stored in the approved sales database. If it is still unclear whether the match confidence is enough 39, then the match may undergo additional manual review 40.

The approved sales data may go through a financial system adapter 41, which may create invoices that may be stored in financial invoices databases 42. Whether an approved sale constitutes and invoice-able sale may depend on the business relationship between the sales matching service provider and the seller. Also, based on the invoices, the system may account for payments made, which may be stored in financial collections databases 43.

The approved sales data may also go through a data adapter 44 which may prepare the data to be placed into a format that goes with the data warehouse database 45. The data warehouse 45 may store records that may be part of a reporting system that can provide dealers with feedback or analysis based on their sales information.

Figure 4:
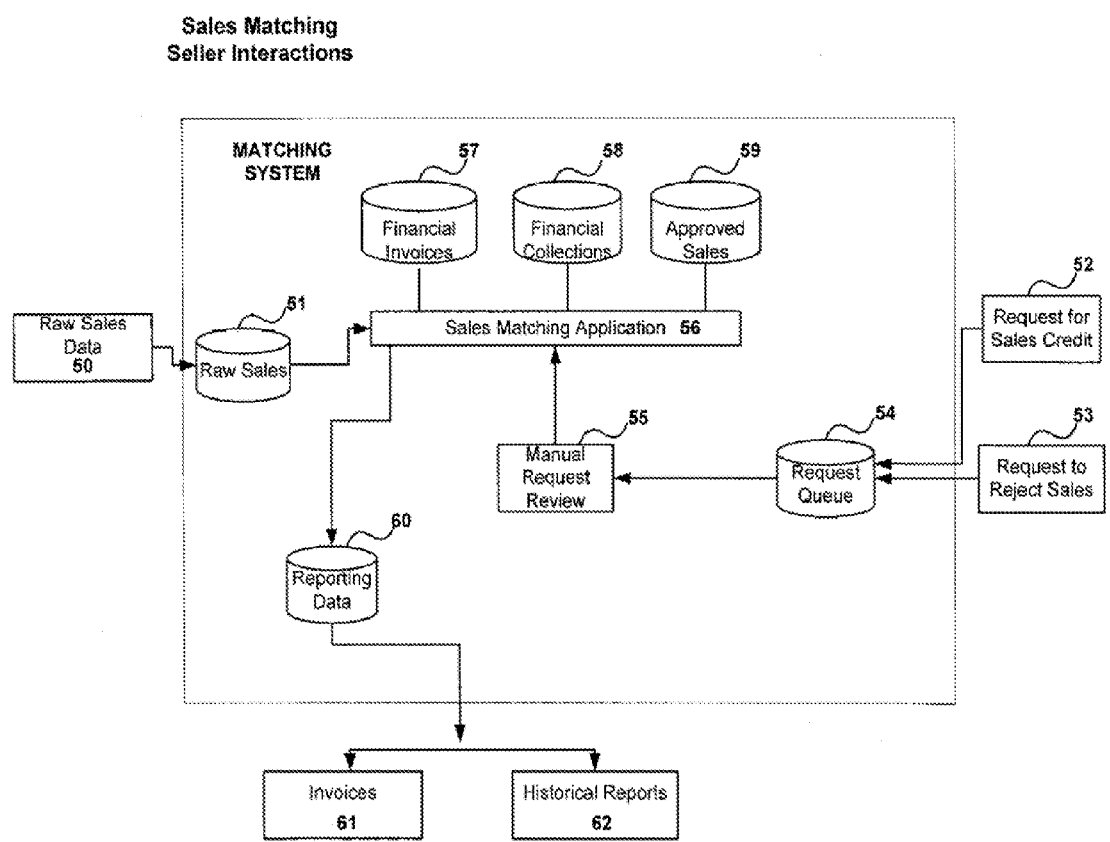
FIG. 4 illustrates seller interactions with a sales matching system.

FIG. 4 illustrates seller interactions with a sales matching system. A seller may communicate with a sales matching service provider by providing raw sales data 50, requesting sales credit 52, or requesting to reject sales 53. A seller may also interact with a sales matching service provider by receiving reporting data such as invoices 61 or historical reports 62.

A seller may be one of the sources that may provide a sales matching service provider with raw sales data 50. The raw sales data may be stored in a raw sales database 51. The sales data may go through a sales matching application 56, which may match sales with leads. A confidence may be assigned to each match. If a match reaches a sufficiently high confidence threshold, then the match may be approved and stored in an approved sales database 59.

The approved sales data may also be used to generate invoices, which may be stored in a financial invoices database 57. Whether an approved sale constitutes an invoice-able sale may depend on the business relationship between the sales matching service provider and the seller. Also, based on the invoices, the system may account for payments made, which may be stored in a financial collections database 58.

A seller may request sales credit 52 or may request to reject sales 53 from a sales matching service provider. Such seller requests may be stored in a request queue database 54. The requests may undergo a manual request review 55, which may determine whether to grant or not grant the requests for sales credit or to reject sales. Decisions whether to grant requests may be communicated to the sales matching application 56. A granted request for sales credit 52 may result in a match that automatically becomes an approved sale, while a granted request to reject a sale 53 may result in automatically preventing a match from becoming an approved sale, no matter the confidence.

The sales matching system may also include a reporting data database 60, which may include any data that the sales matching service provider may wish to provide to the seller. For instance, the sales matching service provider may provide the seller with invoices 61, which may include invoice-able matches and compensation that a seller may owe for a consummated sale from a lead. If a seller disagrees with an item on an invoice, the seller may make a request for sales credit 52 or request to reject sales 53 accordingly. The sales matching service provider may also provide the seller with historical reports 62, which may include information that may provide sellers with performance feedback or analysis based on their sales information.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. An automobile sales lead matching system comprising:
   a database of automobile sales leads data compiled from one or more lead suppliers;
   a database of automobile sales information including sales data from automobile dealers derived from one or more automobile sales related transactions;
   an automobile sales lead matching system at a server having a CPU, in communication with the automobile sales leads database and the automobile sales information database, wherein the matching system includes:
      a data normalization engine for normalizing, using the CPU, the automobile sales related transaction information derived from one or more sources of sales information to provide a normalized sales dataset; and
      a matching engine for matching, using the CPU, at least one sales record from the normalized sales dataset to at least one lead from the automobile sales lead database;
   a sales matching application in communication with the matching engine for identifying a plurality of matched sales that are automatically approved sales or sales requiring manual review; and
   a financial system adaptor for receiving information related to the automatically approved sales that are compiled in a financial collections database or a financial invoices database, wherein the financial invoices database contains information related to invoice-able sales that appear as a line item on an invoice to a seller from a group of sellers for which compensation may be obtained by a sales matching service provider for providing the selected leads giving rise thereto.

2. The automobile sales lead matching system of claim 1, wherein the database of automobile sales information includes information from dealer based sales of automobiles.

3. The automobile sales lead matching system of claim 1, wherein the matching engine establishes matches between the at least one sales record from the normalized sales dataset and the at least one lead from the automobile sales lead database based on a predetermined matching confidence.

4. The automobile sales lead matching system of claim 1 wherein the sales lead data is collected from a group of lead suppliers.

5. The automobile sales lead matching system of claim 4 wherein the group of lead suppliers includes at least one of: a web site or a customer.

6. The automobile sales lead matching system of claim 1 wherein the database of automobile sales information further includes sales data from loan originators or insurance carriers, or both.

7. The automobile sales lead matching system of claim 1 wherein the data normalization engine removes duplicates or unnecessary information, or both.

8. The automobile sales lead matching system of claim 1 further comprising a reporting system that provides dealers with feedback or analysis based on the sales data.

9. The automobile sales lead matching system of claim 1 wherein the lead data and/or the automobile sales information is collected through the Internet or another telecommunication medium.

10. An automobile sales matching system comprising:
a database of automobile sales purchase requests compiled from a plurality of sources of sales purchase request data;
a database of automobile sales information including sales data from automobile dealers derived from a plurality of automobile sales related transactions;
an automobile sales matching system at a server having a CPU, in communication with the automobile sales purchase request database and the automobile sales information database, wherein the matching system includes:
a data normalization engine for normalizing, using the CPU, the automobile sales related transaction information derived from multiple sources of sales information to provide a normalized sales dataset; and
a matching engine for matching, using the CPU, at least one sales record from the normalized sales dataset to at least one purchase request from the source of sales purchase request data
a sales matching application in communication with the matching engine for identifying a plurality of matched sales that are automatically approved sales or sales requiring manual review; and
a financial system adapter for receiving information related to the automatically approves sales that are compiled in a financial collections database or a financial invoices database, wherein the financial invoices database contains information related to invoice-able sales that appear as a line item on an invoice to a seller from a group of sellers for which compensation may be obtained by a sales matching service provider for providing the selected leads giving rise thereto.

11. The automobile sales matching system of claim 10, wherein the database of automobile sales information includes information from dealer based sales of automobiles.

12. The automobile sales matching system of claim 10, wherein the matching engine establishes matches between the at least one sales record from the normalized sales dataset and the at least one purchase request from the source of sales purchase request data based on a predetermined matching confidence.

13. The automobile sales matching system of claim 10 wherein the purchase requests collected from a group of lead suppliers.

14. The automobile sales matching system of claim 13 wherein the group of lead suppliers includes at least one of: a web site or a customer.

15. The automobile sales matching system of claim 10 wherein the database of automobile sales information further includes sales data from loan originators or insurance carriers, or both.

16. The automobile sales matching system of claim 10 wherein the data normalization engine removes duplicates or unnecessary information, or both.

17. The automobile sales matching system of claim 10 further comprising a reporting system that provides dealers with feedback or analysis based on the sales data.

18. The automobile sales matching system of claim 10 wherein the purchase requests and/or the automobile sales information is collected through the Internet or another telecommunication medium.

* * * * *